United States Patent [19]

Chang

[11] Patent Number: 4,731,290

[45] Date of Patent: Mar. 15, 1988

[54] PROCESS FOR IMPROVING THE APPEARANCE OF A MULTILAYER FINISH

[75] Inventor: David C. K. Chang, Birmingham, Mich.

[73] Assignee: E. I. Du Pont de Nemours and Company, Wilmington, Del.

[21] Appl. No.: 906,195

[22] Filed: Sep. 11, 1986

[51] Int. Cl.[4] .......................... B05D 1/36; B05D 7/00; B32B 27/00; C08F 82/80

[52] U.S. Cl. .................................. 428/335; 427/407.1; 427/409; 428/500; 525/162; 525/163

[58] Field of Search ...................... 427/409, 407.1, 379, 427/380, 388.4; 525/162, 163; 428/335, 500

[56] References Cited

U.S. PATENT DOCUMENTS

| | | | |
|---|---|---|---|
| 3,839,254 | 10/1974 | Fang | 260/29.6 |
| 3,862,071 | 1/1975 | DiCarlo | 260/29.4 |
| 4,098,740 | 7/1978 | Wallace | 260/29.6 |
| 4,140,836 | 2/1979 | Wallace | 428/463 |
| 4,187,258 | 2/1980 | Simon | 525/157 |
| 4,191,624 | 3/1980 | Josefson et al. | 204/181 T |
| 4,232,090 | 11/1980 | Simon | 428/424.4 |
| 4,303,581 | 12/1981 | Levine et al. | 260/18 PF |
| 4,403,003 | 9/1983 | Backhouse | 427/407 |
| 4,404,248 | 9/1983 | Spinelli et al. | 427/409 X |
| 4,508,767 | 4/1985 | Hokamura et al. | 427/409 X |
| 4,620,994 | 11/1986 | Suss et al. | 427/409 X |

*Primary Examiner*—Michael R. Lusignan
*Attorney, Agent, or Firm*—Hilmar L. Fricke

[57] ABSTRACT

An improved process for applying a multilayer finish on a primer coated substrate by using a guide coating composition that is applied over the primer of the substrate and then a water borne base coating composition containing metallic pigments and a clear coating composition are applied; before the base coating composition is applied, the guide coating composition is dried at ambient temperatures or at elevated temperatures but not fully cured or crosslinked; the guide coating contains a polymeric latex in an aqueous carrier, preferably an acrylic latex, and optionally, a crosslinking agent and metallic flake pigments; the process improves the appearance, particularly head-on-brightness of water borne basecoat/clear coat finishes in which the base coat contains metallic flake pigments.

12 Claims, No Drawings

PROCESS FOR IMPROVING THE APPEARANCE OF A MULTILAYER FINISH

BACKGROUND OF THE INVENTION

This invention is related to an improved process for forming multilayer finishes on automobiles and trucks. In particular, the process forms finishes that have an improved appearance.

Multilayer finishes, in particular, clear coat/base coat finishes are well known in the art, as shown, for example, in Benefiel et al U.S. Pat. No. 3,639,147, issued Feb. 1, 1972. Generally, solvent based coating compositions have been used to form these multilayer finishes. To comply with current air quality standards, water borne base coat finishes in combination with either solvent based or water based clear coat finishes are being tested for use. However, it would be desirable to improve the appearance of water borne base coat finishes containing metallic flake pigments. In particular, improvements in head-on-brightness would be desired. This invention provides an improved process and a composition that can be applied by this process to form a clear coat/base coat finish with water borne base coating compositions containing metallic flake pigments that have a high quality appearance that is acceptable to the automotive industry.

SUMMARY OF THE INVENTION

This invention is directed to an improved process for applying a multilayer finish to a substrate that has a primer layer adhered thereto and a layer of a water borne base coating composition containing metallic flake pigments and a layer of a clear top coating composition; the improvement that is used with this process comprises the following:

applying a layer of a waterborne guide coating composition containing an aqueous carrier and a polymeric binder to the primer layer before application of the water borne base coating composition and drying the guide coating at ambient temperatures or at an elevated temperature without crosslinking or curing the guide coating and then applying the waterborne base coating composition to the guide coating and clear top coating composition to the base coating and baking at elevated temperatures to fully cure the resulting multilayer finish; whereby the resulting multilayer finish on the substrate comprising the guide coating, base coating and clear topcoating has an improved appearance.

DETAILED DESCRIPTION OF THE INVENTION

The improved process of this invention is used to improved the appearance of a water borne base coating composition/clear coating composition used for automobiles and trucks. In this process, a guide coating is applied over the primer coating of the substrate and then dried but not cured. The guide coat can be dried at ambient temperatures e.g. 20°-25° C. or baked at elevated temperatures up to 180° C. for a short time or exposed to infrared radiation for rapid drying taking care not to crosslink the guide coat. Then the water borne base coating is applied over the guide coating and then the clear coating composition is applied over the base coating and the resulting coated substrate is baked at an elevated temperature to form a fully cured multilayer finish. The resulting base coat/clear coat finish has an improved appearance, particularly for head-on-brightness, in comparison to clear coat/color coat finishes that do not use a guiding coating composition.

The guide coating composition is an aqueous based composition containing about 10-75% by weight of a film forming binder and preferably, a crosslinking agent and pigments. Typically, an aqueous latex is used as the film forming binder and preferably, an acrylic latex is used. An alkylated melamine formaldehyde crosslinking agent can be used in the composition. Any of the conventional pigments used for coating compositions or primers can be used in the composition.

Usually, the binder of the guide coating composition is an acrylic latex but other water dispersible or water soluble polymers can be used. The latex is prepared by a conventional emulsion polymerization process in which monomers, a polymerization catalyst such as ammonium persulfate, water, surfactants and usually a neutralizing agent such as ammonia or an amine such as amino ethyl propanol are utilized. The polymerization is carried out under conventional temperatures of about 50°-90° C. for about 1-5 hours to form a latex.

The monomers used for the latex are alkyl methacrylates, alkyl acrylates, hydroxy alkyl acrylates and methacrylates and an ethylenically unsaturated polymerizable mono or di carboxylic acids. Difunctional acrylates or methacrylates also can be used.

Typical alkyl methacrylates are methyl methacrylate, ethyl methacrylate, propyl methacrylate, butyl methacrylate, hexyl methacrylate, octyl methacrylate, nonyl methacrylate, lauryl methacrylate and the like.

Typical alkyl acrylates are methyl acrylate, ethyl acrylate, propyl acrylate, butyl acrylate, hexyl acrylate, octyl acrylate, nonyl acrylate, lauryl acrylate and the like.

Typical hydroxy alkyl acrylates and hydroxy alkyl methacrylates that can be used are hydroxy ethyl methacrylate, hydroxy propyl methacrylate, hydroxy butyl methacrylate, hydroxy ethyl acrylate, hydroxy propyl acrylate, hydroxy butyl acrylate and the like.

Typical polymerizable mono or di carboxlic acids that can be used are methacrylic acid, acrylic acid, itaconic acid, maleic acid and the like.

Difunctional monomers that can be used are allyl methacrylate, allyl acrylate and other diacrylates.

One preferred latex polymer contains 10-20% by weight methyl methacrylate, 70-80% by weight butyl acrylate, 2-9% by weight hydroxy ethyl acrylate, and 1-5% by weight methacrylic acid.

The latex itself without a crosslinking agent can be used as a guide coating composition. This has an advantage that the latex does not crosslink on drying or baking at an elevated temperature.

Generally, the guide coating contains about 5-40% by weight, based on the weight of the binder, of the crosslinking agent. One preferred composition contains about 5-30% by weight of the crosslinking agent and 70-95% of the latex polymer.

Typical monomeric and polymeric alkylated melamine formaldehyde crosslinking agents that can be used are partially or highly methylated melamine formaldehyde resins, such as "Cymel" 300 resins, mixed ether and butylated melamine formalhyde resins or other partially or fully alkylated melamine formaldehyde resins having 1-6 carbons in the alkyl group. One preferred resin is "Cymel" 325 which is a methylated melamine formaldehyde resin that has a methoxymethylimino functionality. Another preferred resin is "Cymel"

303 which is a highly methylated melamine formaldehyde resin containing reactive alkoxy groups.

The guide coating composition can be used as an unpigmented clear but preferably contains pigments in a pigment to binder weight ratio of about 0.5/100 to 300/100. Generally, the pigments provide additional hiding and are usually the same as the pigments of the base coating composition. Typical pigments that can be used are titanium dioxide, other metallic oxides such as zinc oxide and iron oxide, carbon black, organic pigments and dyes, metallic flake pigments such as aluminun flake, filler pigments, silica, and the like. Preferably, the composition contains metallic flake pigments such as aluminum flake. The pigments are formulated into a millbase using conventional procedures and then the mill base is blending with the latex and the crosslinking agent to form the guid coating composition.

The substrates over which the guide coat is applied are those conventionally used for automotive and truck bodies such as cold roll steel, phosphatized steel, polyester reinforced fiber glass, reaction injection molded urethanes, crystalline amorphous polyamides and the like. Typically, these substrates are coated with alkyd resin, epoxy resin or polyester primers.

After the primer is applied to the substrate and cured, the guide coating compositon is applied. Any of the conventional methods of application can be used such as spraying or electrostatic spraying. The coating is applied to provide a dry film thickness of about 0.1 to 1.0 mils. The coating is then dried but not fully cured or crosslinked. The base coating composition is applied by spraying or electrostatic spraying to provide a dry film of about 0.2–1.5 mils thick. A clear coating composition is applied by spraying or electrostatic spraying to a dry film thickness of about 0.5–6.0 mils. The resulting multilayer finish then is baked at about 120°–175° C. for about 15 minutes—1 hour to form a glossy finish having excellent head-on-brightness and a good appearance.

The base coating composition can be any of the composition that are conventionally used such as acrylics or polyesters containing crosslinking agents. These compositions can be solvent or water based solutions or dispersions. The process of this invention is particularly useful for waterborne base coatings containing metallic flake pigments and provides a finish with improved head-on-brightness. However, improvements are noted also with the use of solvent based base coat finishes.

The clear coating composition can be a solvent or water based composition of an acrylic or polyester polymer and containing a crosslinking agent or other type of composition as are conventially used for clear coating compositions.

The guide coating composition also can be used with two component base coat/clear coat compositions that do not require baking for curing such as two component acrylic urethanes, acrylic esters, acrylic alkyds, epoxy esters and the like. These two component compositions are used to refinish cars and trucks. Application of the guide coating composition is the same as above and then the two component base coating composition and clear coating composition are applied and cured at ambient temperatures or force dried at elevated temperatures.

The following examples illustrate the invention. All parts and percentages are on a weight bases unless otherwise indicated.

EXAMPLE

A latex was prepared by charging the following ingredients into a polymerization vessel equipped with a stirrer and a heating source:

| | Parts By Weight |
|---|---|
| Portion 1 | |
| Deionized water | 2535.0 |
| Alkyl phenol ethylene oxide anionic surfactant | 16.4 |
| Portion 2 | |
| Anionic surfactant (described above) | 23.4 |
| Methyl methacrylate monomer | 369.0 |
| Butyl methacrylate monomer | 1622.4 |
| Deionized water | 2335.0 |
| Portion 3 | |
| Deionized water | 225.0 |
| Ammonium persulfate | 7.0 |
| Portion 4 | |
| Deionized water | 1097.0 |
| Anionic surfactant (described above) | 11.7 |
| Methacrylic acid | 81.7 |
| Hydroxy ethyl acrylate monomer | 116.8 |
| Butyl acrylate monomer | 385.3 |
| Portion 5 | |
| Deionized water | 85.0 |
| Ammonium persulfate | 2.3 |
| Portion 6 | |
| Deionized water | 451.0 |
| Amino ethyl propanol | 60.7 |
| "Cosan" 145 - latex preservative of an oxazolidine derivative made by Cosan Chemical Corp. | 10.0 |
| Total | 9434.6 |

Portion 1 is charged into the polymerization vessel and heated to about 83° C. Portion 2 is premixed. About 10% of Portion 2 is added and the resulting reaction mixture is held at about 80° C. About 10% of Portion 3 is added and the reaction mixture is held at the above temperature. The remainder of Portion 2 is added over a 60 minute period along with about 72% of Portion 3 while controlling the reaction mixture at about 85° C. The remainder of Portion 3 along with Portion 4 is added over a 30 minute period while controlling the reaction mixture at 85° C. Portion 5 is added and the reaction mixture is held at about 85° C. for 60 minutes. Portion 6 is added over a 30 minute period and held at the above temperature for about 1 hour. The resulting latex is cooled to room temperature and filtered.

The latex has a polymer solids content of 27.7% and a pH of 7.2. The polymer is comprised of 14.3% methyl methacrylate, 78.0% butyl acrylate, 3.2% methacrylic acid, and 4.5% hydroxy ethyl acrylate.

A mill base was prepared as follows:

| | Parts By Weight |
|---|---|
| Ethylene glycol monobutyl ether | 55.13 |
| Polyoxyethylene ester of mixed fatty acids and resins | 4.87 |
| Aluminum flake paste - 65% solids aluminum flake in mineral spirits | 40.00 |
| Total | 100.00 |

The above constituents are charged into a mixing vessel and thoroughly mixed together.

The following guide coating compositions A–C were formulated:

| | Parts By Weight | | |
|---|---|---|---|
| COMPOSITION | A | B | C |
| Latex (prepared above) | 1557.0 | 1557.0 | 1557.0 |
| Deionized water | 488.0 | 1029.0 | 1029.0 |
| Melamine formaldehyde resin solution (80% solids in isobutanol of a highly methylated melamine formaldehyde resin having a low methylol content and containing alkoxy imino groups) | 104.0 | 104.0 | — |
| Mill base (prepared above) | 331.0 | — | — |
| Deionized water | 541.0 | — | — |
| Dimethyl ethanol amine | 23.4 | 23.4 | 23.4 |
| "Acrysol" ASE 60 (Acrylic latex thickener) | 28.0 | 28.0 | 28.0 |
| Total | 3072.4 | 2741.4 | 2637.4 |

Each of the above Guide Coating Compositions A–C were sprayed onto separate phosphatized steel panels coated with an epoxy/polyester electrodeposition primer. Each composition was sprayed onto four separate panels. One panel was dried at ambient temperature of about 25° C. for about 30 minutes; the second panel was baked for about 2 minutes at about 104° C. which was sufficient time to dry the coating but not cure the coating; the third panel was baked for about 10 minutes at about 121° C. which was sufficient time to cure the coating and the fourth panel was baked for about 30 minutes at 121° C. which was sufficient to cure the coating. In each case the dried Guide Coating was about 0.3 mils thick when dried.

A base coating was then applied by spraying a layer of above Composition A to each of the above coated panels and the base coating was dried at ambient temperatures for about 10 minutes to form a dried coating about 0.5 mils thick. Then a clear topcoating was spray applied and the coated panels were baked for about 30 minutes at about 120° C. to form a clear coat/base coat finish.

The above clear coating composition has a solids content of about 68% in a 50/50 solvent mixture of methyl amyl ketone and aromatic hydrocarbon wherein the polymer comprises styrene/butyl methacrylate/butyl acrylate/hydroxy ethyl acrylate/acrylic acid in a ratio of about 14.9/28/30/25/2.1.

A control for each of the guide coats A–C of phosphatized primed steel panel was prepared as above i.e., the panel was coated with the base coat and the clear coat as above, except a guide coat was omitted. Each panel was baked under the same conditions. These panels were used as the controls and represents prior art method of preparing a clear coat/base coat finish.

The head on brightness was measured using the spectrophotometer described in Lee et al. U.S. Pat. No. 4,412,744 issued Nov. 1, 1983 for each of the above prepared panels and the results are as follows:

| GUIDE COATING | DRY AMBIENT TEMP/BAKE | HEAD-ON-BRIGHTNESS | NOTE |
|---|---|---|---|
| CONTROL | (NO GUIDE COATING) | 113 | — |
| GUIDE COAT A | 30′ × AMB. TEMP. | 119 | HIGHER HOB AND BETTER UNIFORMITY |
| GUIDE COAT A | 2′ × 104° C. | 120 | HIGHER HOB AND BETTER UNIFORMITY |
| GUIDE COAT A | 10′ × 121° C. | 112 | SAME AS CONTROL |
| GUIDE COAT A | 30′ × 121° C. | 112 | SAME AS CONTROL |
| CONTROL | (NO GUIDE COATING) | 114 | — |
| GUIDE COAT B | 30′ × AMB. TEMP. | 122 | HIGHER HOB AND BETTER UNIFORMITY |
| GUIDE COAT B | 2′ × 104° C. | 124 | HIGHER HOB AND BETTER UNIFORMITY |
| GUIDE COAT B | 10′ × 121° C. | 113 | SAME AS CONTROL |
| GUIDE COAT B | 30′ × 121° C. | 115 | SAME AS CONTROL |
| CONTROL | (NO GUIDE COATING) | 113 | — |
| GUIDE COAT C | 30′ × AMB. TEMP. | 123 | HIGHER HOB AND BETTER UNIFORMITY |
| GUIDE COAT C | 2′ × 104° C. | 122 | HIGHER HOB AND BETTER UNIFORMITY |
| GUIDE COAT C | 10′ × 121° C. | 120 | HIGHER HOB AND BETTER UNIFORMITY |
| GUIDE COAT C | 30′ × 121° C. | 120 | HIGHER HOB AND BETTER UNIFORMITY |

The above data shows that when no guide coating is used (control) head-on-brightness is noticeably lower than with a guide coating. Also, when the guide coats A and B are completely cured as occurs by baking for 10′ at 121° C. and for 30′ at 121° C., head-on-brightness is substantially lower in comparison to only drying or partially curing the guide coat.

With guide coating C which is the acrylic latex without a crosslinking agent curing does not occur and the desirable improvement by use of this guide coat is noted at all baking temperatures.

What is claimed is:

1. An improved process for applying a multilayer finish on a substrate having a primer layer, a layer of a waterborne base coating composition containing metallic flake pigments and a layer of a clear coating composition in adherence to the base coating; the improvement used therewith comprises:

applying a layer of a waterborne guide coating composition to the primer layer of the substrate and drying said composition without crosslinking or curing said guide coating composition, said coating composition comprising an aqueous carrier, and a binder consisting essentially of 60-95% by weight of a dispersed acrylic polymer and 5-40% by weight of an alkylated melamine formaldehyde crosslinking agent;

applying a waterborne base coating composition to the guide coating and thereafter applying a clear top coating composition to the base coating and baking at elevated temperatures to fully cure the resulting multilayer finish; whereby the resulting multilayer finish on the substrate comprising the guide coating, base coating and clear top coating has an improved appearance.

2. The improved process of claim 1 in which the guide coating composition is dried at about 20°-185° C.

3. The improved process of claim 1 in which the guide coating composition comprises a latex of an acrylic polymer consisting essentially of an alkyl methacrylate, and alkyl acrylate, a hydroxy alkyl acrylate or methacrylate and an ethylenically unsaturated carboxylic acid and the crosslinking agent comprises an alkylated melamine formaldehyde resin.

4. The improved process of claim 1 in which the acrylic polymer contains hydroxyl and carboxyl groups.

5. The improved process of claim 4 in which the acrylic polymer consists essentially of an alkyl methacrylate, an alkyl acrylate, a hydroxy alkyl acrylate or methacrylate and an ethylenically unsaturated carboxylic acid.

6. The improved process of claim 5 in which the acrylic polymer contains a difunctional acrylate or methacrylate.

7. The improved process of claim 5 in which the acrylic polymer consists essentially of methyl methacrylate, butyl acrylate, hydroxy ethyl acrylate and methacrylic acid.

8. The improved process of claim 7 in which the acrylic polymer contains allyl methacrylate.

9. A guide coating composition comprising about 10-75% by weight of binder and 25-90% by weight of an aqueous carrier; wherein the binder consists essentially of 60-90% by weight of a dispersed acrylic polymer consisting essentially of about 10-20% by weight based on the weight of the polymer of methyl methacrylate, 70-80% by weight, based on the weight of the polymer of butyl acrylate, 2-9% by weight, based on the weight of the polymer of hydroxy ethyl acrylate and 1-5% by weight based on the weight of the polymer of methacrylic acid;

5-40% by weight of an alkylated melamine formaldehyde resin and containing pigment in a pigment to binder ratio of about 0.5/100-300/100.

10. A primer coated substrate having a cured multilayer finish comprising a layer of the guide coating composition in adherence to the primer coated substrate, a pigmented base coating in adherence to the guide coating composition and a clear top layer in adherence to the base coating wherein the guide coating composition comprising about 10-75% by weight of binder and 25-90% by weight of an aqueous carrier; wherein the binder consists essentially of 60-95% by weight of a dispersed acrylic polymer consisting essentially of about 10-20% by weight based on the weight of the polymer of methyl methacrylate, 70-80% by weight, based on the weight of the polymer of butyl acrylate, 2-9% by weight, based on the weight of the polymer of hydroxy ethyl acrylate and 1-5% by weight based on the weight of the polymer of methacrylic acid; 5-40% by weight of an alkylated melamine formaldehyde resin and containing pigment in a pigment to binder ratio of about 0.5/100-300/100.

11. The coated substrate of claim 10 in which the guide coating is about 0.1-1.0 mils thick, the base coating is about 0.2-1.5 mils thick and the clear top coating is about 0.5-6 mils thick.

12. The improved process of claim 1 in which the guide coating composition contains metallic flake pigments.

* * * * *